Feb. 17, 1931.  G. E. A. HALLETT  1,792,493
WHEEL VIBRATION DAMPENER
Filed April 25, 1927  2 Sheets-Sheet 1

Inventor
George E. A. Hallett
By Blackmore, Spencer & Hulit
Attorneys

Patented Feb. 17, 1931

1,792,493

UNITED STATES PATENT OFFICE

GEORGE E. A. HALLETT, OF DETROIT, MICHIGAN, ASSIGNOR TO GENERAL MOTORS RESEARCH CORPORATION, OF DETROIT, MICHIGAN, A CORPORATION OF DELAWARE

WHEEL-VIBRATION DAMPENER

Application filed April 25, 1927. Serial No. 186,448.

This invention relates to automotive vehicles and particularly to the means for reducing or eliminating the "tramp" and "shimmy" in the steering wheels.

In my investigation of the phenomenon of "tramp" and "shimmy" in the steering wheels of automotive vehicles, I have found that the two are interrelated and the elimination of the one will automatically result in the elimination of the other.

On the accompanying drawing I have shown several ways in which this phenomenon may be removed. In the preferred form I make use of a weight suspended between two springs and attach the structure to the axle. The inertia of the weight will act in a direction opposite to the movement of the axle and in this way steady the axle by removing the "tramp" thereof.

In another species I suspend two weights on the ends of a bar member extending longitudinally of the vehicle and attached the bar to the steering knuckle. This member is preferably a leaf spring composed of progressively decreasing laminations. The weights in this modification vibrate out of phase with the front wheels which will bring about a smoother running in that the shimmy of the wheels will be diminished if not entirely done away with.

As a further modification I pivot the bar to the center of the axle and support its ends through the interposition of an elastic medium between the bar and the axle. Due to its inertia this weight will oppose the oscillations of the axle and by opposing its own inertia force thereon will tend to eliminate the "tramp" in the axle and accordingly set aside the "shimmy" of the wheels.

As a further modification I pivot on the steering knuckle a resilient bar preferably composed of a plurality of laminations and to the ends of this bar I attach weights and between the bar and the brake housing on the front wheels I interpose resilient members preferably coil springs to keep the bar away from the wheel. As the front wheel swings about on its pivot in steering, the inertia of the weights will oppose the movements and impress the effect of this inertia on the wheel, resulting in the removal of shimmy. Similarly the inertia of the weights opposed the up and down movement of the axle and accordingly does away with its "tramp".

The invention is disclosed on the accompanying drawing in which

Figure 1:
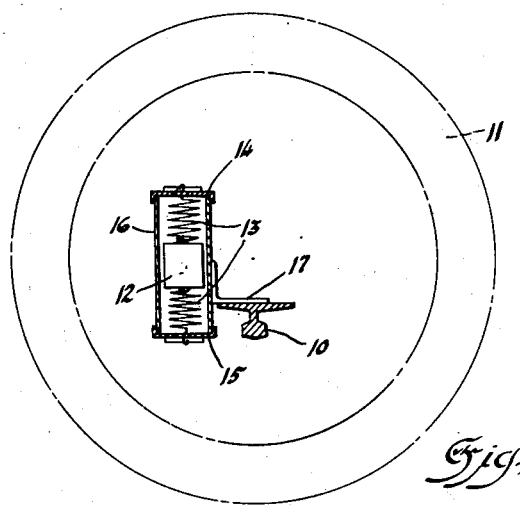
Figure 1 is a sectional view through the axle of a motor vehicle showing one embodiment of my invention attached to the axle center.

Referring to Figure 1, 10 designates the axle of an automobile and 11 one of the front wheels thereof. The oscillating weight of the present invention is shown at 12 and this weight is suspended by means of springs 13, preferably coil springs, between the top and bottom portions 14 and 15 of a box-like housing 16 attached to the axle 10 by means of an angle bracket 17. The springs are attached to the weight as well as to the top and bottom of the housing.

In this species of invention when the axle 10 tends to move either up or down due to striking a rut in the road, or from any other cause, it is obvious that the inertia of the weight 12 will oppose this movement. These two opposing forces will tend to neutralize each other and result in elimination of the "tramp" of the axle. The springs 13 tend to maintain the weight in the position shown in Figure 1.

Figure 2:
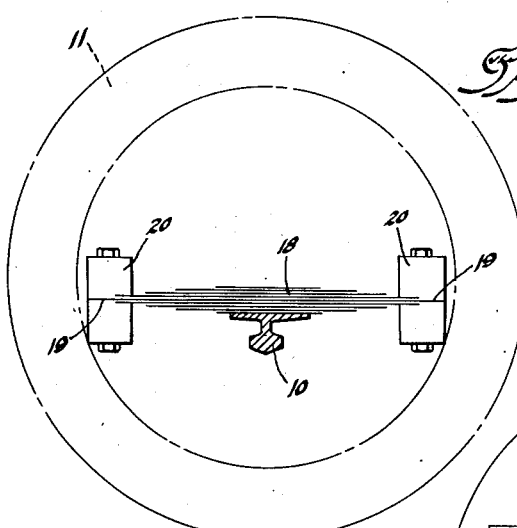
Figure 2 is a view similar to Figure 1 but of a modified form of the invention.

Referring to the species of Figure 2, I make use of a laminated leaf spring 18 attached at its mid point to the center of the axle. At each end 19 of the spring 18 I attach a pair of weights 20 although a single weight may be used.

The operation of the structure of Figure 2 is similar to that of Figure 1, the spring 18 in the species performing the functions of the springs 13 in Figure 1. Similarly to Figure 1 the inertia of the weights 20 will oppose any up or down movement of the axle 10.

Figure 3:
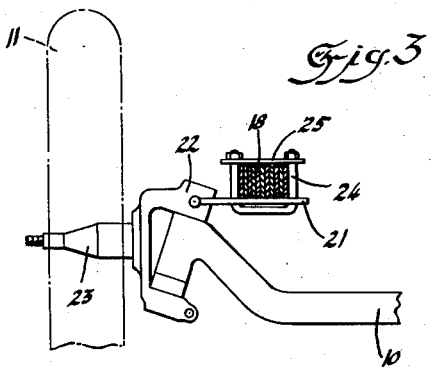
Figure 3 is a front view of a portion of a motor vehicle showing a third embodiment of my invention in which the oscillating plates are attached to the steering knuckle.
Figure 4:
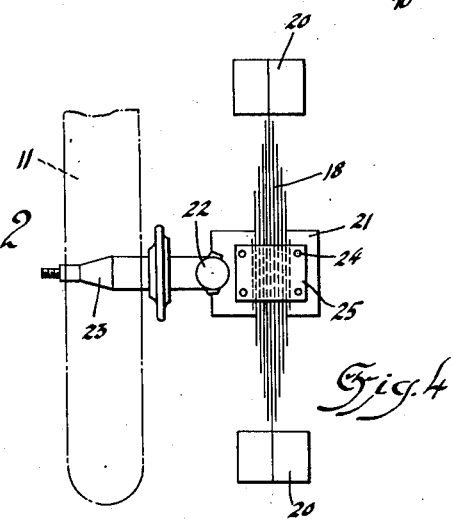
Figure 4 is a plan view of the structure of Figure 3.

Referring to the species of Figure 3 it will be noted that the spring and weight structure of Figure 2 is attached to a bracket or plate 21 secured to the yoke 22 of the wheel spindle 23. The spring 18 is held on the bracket 21 by means of a U-bolt 24 and a plate 25. The operation of the structure in Figures 3 and 4 is different from that of Figure 2 in that the vibration of the weights 20 will be in a horizontal instead of a vertical plane. This oscillation in a horizontal plane, due to the inertia of the weights, will tend to oppose any movement of the front wheel 11 away from a straight line path. This opposition to the wheel movement will tend to eliminate the "shimmy" in the wheels and accordingly also eliminate the "tramp" in the axle.

Figure 5:
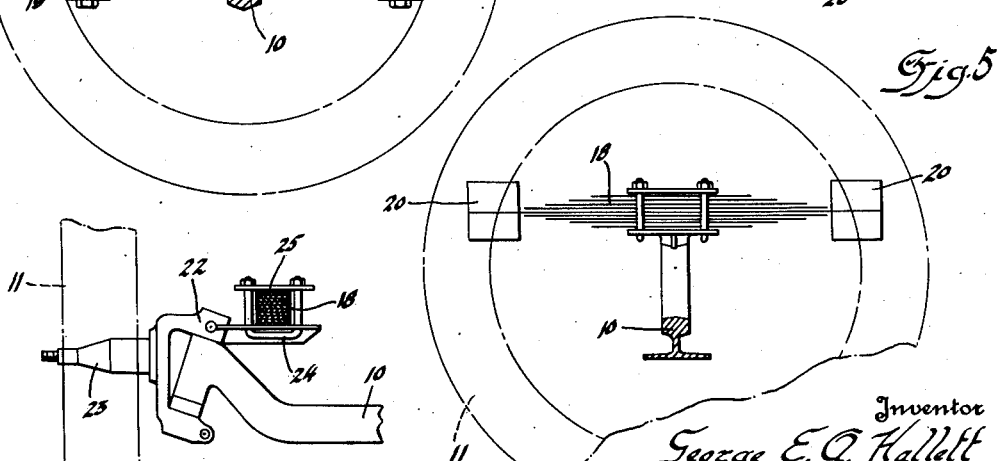
Figure 5 is a sectional view of the further modification of the invention, the structure differing from that of Figure 4 in that the spring is placed so that the weights will operate in a vertical instead of a horizontal plane.
Figure 6:
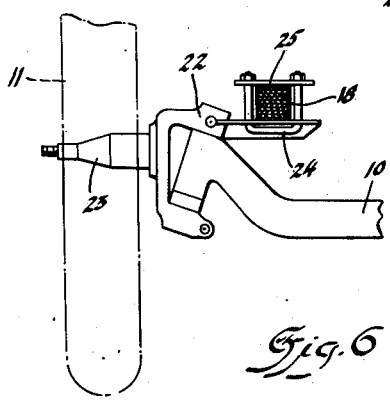
Figure 6 is a side view of the structure of Figure 5 with the weight removed.

The structure of Figures 5 and 6 differs from that of Figures 3 and 4 in that the spring 18 has been turned through an angle of 90°, giving oscillations of the weights 20 in a vertical instead of a horizontal plane. In this species as well as in the species in Figures 3 and 4, a similar spring and pair of weights is placed on the steering spindle yoke at the opposition side of the vehicle.

The operation of the structure of Figures 5 and 6 is analogous to that of Figure 2.

Figure 7:
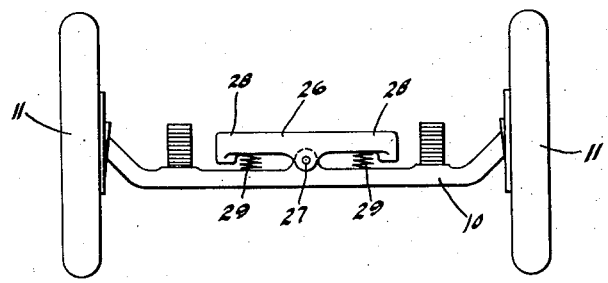
Figure 7 is a front view of an axle of an automobile showing a further modification of the invention.

The structure of Figure 7 shows a weight 26 having a pivot 27 at the central portion of the axle and its ends 28 separated from the axle by means of the springs 29 (preferably coil springs) so as to give a resilient action to the ends of the weights 28 about the pivot 27. The springs 29 tend to hold the weight 26 normally in the position shown in Figure 7.

The operation of the structure of Figure 7 is as follows: When either of the wheels tend to rise or fall its motion will be opposed by the inertia of the ends 28 of the weight 26. This opposition in vibration of the ends 29 of the weight 28 relative to the axle 10 will tend to eliminate the "tramp" in the axle and accordingly eliminate the "shimmy" in the wheels.

Figure 8:
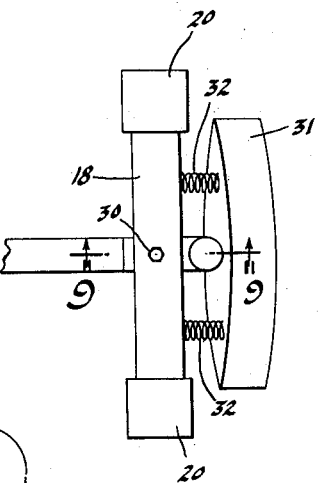
Figure 8 is a plan view of the axle of an automobile showing a still further modification of the invention.
Figure 9:
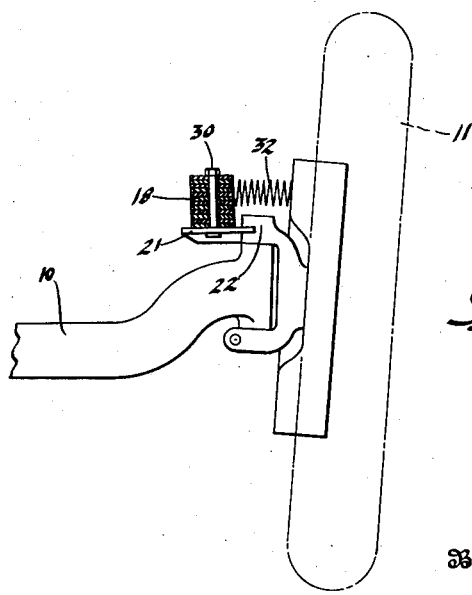
Figure 9 is a section on the line 9—9 of Figure 8.

Figs. 8 and 9 disclose a still further modification of the invention. In this species the spring 18 and weights 20 are attached to the steering knuckle yoke 22 in the manner similar to that shown in Figs. 5 and 6. Except that the spring is pivoted at 30 to the bracket 21 between the spring 18 and the brake housing 31 of the front wheels, there is interposed resilient members 32, preferably coil springs, which normally hold the spring 18 in the position shown in the figures. The oscillation of the weights 20 in the horizontal plane will tend to eliminate the "tramp" in the axle and resistance offered by the inertia of the weights 20 to the swing of the front wheel about its knuckle pin will tend to eliminate the "shimmy" in the wheels. The structure of Figs. 8 and 9 is substantially a combination of the structures of Figs. 3 to 6 inclusive.

I claim:

1. In a vehicle, an axle, a bracket secured to said axle, a box-like structure attached to said bracket, an oscillatable weight suspended from said structure, resilient means in said structure above and below said weight.

2. In a vehicle, an axle, a bracket secured to said axle, a box-like structure attached to said bracket, an oscillatable weight suspended from said structure, and coil springs above and below said weight and within said structure to suspend said weight.

In testimony whereof I affix my signature.

GEORGE E. A. HALLETT.